US012236183B2

(12) United States Patent
Fitzgerald et al.

(10) Patent No.: US 12,236,183 B2
(45) Date of Patent: Feb. 25, 2025

(54) METHODS AND APPARATUS FOR SELECTING, HIGH LIGHTING AND/OR PROCESSING, TEXT INCLUDED IN A PDF DOCUMENT

(71) Applicant: Accusoft Corporation, Tampa, FL (US)

(72) Inventors: Shayne Fitzgerald, Austin, TX (US); Charlie Davis, Tampa, FL (US); Harry Arnold Epperson, IV, Tampa, FL (US); Alexandra Debish, Tampa, FL (US); Kiril Vatev, Brooklyn, NY (US); Stephen C. Brooks, Sparta, NC (US); Zach Roach, Auburndale, FL (US); Kiefer Sivitz, Tampa, FL (US); Cody Owens, Vancouver, WA (US)

(73) Assignee: Accusoft Corporation, Tampa, FL (US)

( * ) Notice: Subject to any disclaimer, the term of this patent is extended or adjusted under 35 U.S.C. 154(b) by 0 days.

(21) Appl. No.: 18/424,718

(22) Filed: Jan. 26, 2024

(65) Prior Publication Data

US 2024/0169144 A1    May 23, 2024

Related U.S. Application Data

(63) Continuation of application No. 17/896,695, filed on Aug. 26, 2022, now abandoned.

(51) Int. Cl.
*G06F 40/166* (2020.01)
*G06F 40/106* (2020.01)
(Continued)

(52) U.S. Cl.
CPC .......... *G06F 40/166* (2020.01); *G06F 40/106* (2020.01); *G06F 40/14* (2020.01); *G06F 40/154* (2020.01)

(58) Field of Classification Search
None
See application file for complete search history.

(56) References Cited

U.S. PATENT DOCUMENTS 7,107,521 B2 *  9/2006  Santos .................... H04L 67/02
                                                 715/239
8,139,860 B2 *  3/2012  Liu ....................... G06F 16/583
                                                 382/173
(Continued)

OTHER PUBLICATIONS

Hadjar el al "Xed: a new tool for extracting hidden structures from Electronic Documents", 2004 IEEE, 13 pages.*

(Continued)

*Primary Examiner* — Maikhanh Nguyen
(74) *Attorney, Agent, or Firm* — Straub & Straub; Michael P. Straub; Stephen T. Straub

(57) ABSTRACT

Methods and apparatus for determining which displayed content, e.g., text, of a PDF document is selected and then taking an action based on the text selection, e.g., highlighting, coping, or editing the selected text. The methods and apparatus take into consideration potentially differences between text position and/or size differences between rendered and displayed page content and text position and/or size information obtained from performing a text extraction operation on the content of a PDF document. By combining extracted text information with post-render information corresponding to individual DOM elements in synthesized text elements and then storing the information in an easily access data structure, accurate identification of selected text characters can be made in a relatively fast manner using a browser implemented application.

14 Claims, 14 Drawing Sheets

(51) Int. Cl.
    *G06F 40/14*           (2020.01)
    *G06F 40/154*        (2020.01)

(56)               References Cited

U.S. PATENT DOCUMENTS

| | | | | |
|---|---|---|---|---|
| 8,706,711 B2* | 4/2014 | Vaddadi | ............... | G06F 18/211 |
| | | | | 707/706 |
| 8,869,023 B2* | 10/2014 | Berkner | ............... | G06F 40/14 |
| | | | | 715/201 |
| 2009/0044106 A1* | 2/2009 | Berkner | ............... | G06F 40/103 |
| | | | | 707/999.102 |
| 2021/0271805 A1* | 9/2021 | Comeau | ............... | G06F 40/154 |

OTHER PUBLICATIONS

Chia el al "Text Extraction and Categorization from Watermark Scientific Document in Bulk", 2018 IEEE, pp. 47-51.*

* cited by examiner

PRE-RENDERED DOM ELEMENTS — 234'

```
<span
  role="presentation"
  dir="ltr"
  data-test="text-span"
  style="left: 102.74px; top: 259.082px; font-size: 21.96px; font-family: sans-serif; transform: scaleX(1.02369);"
>Programmable DC Electronic Loads</span>
```

700
SYNTHETIC TEXT ELEMENT

702 — "left": 102.74,
"top": 259.082,
"height": 21.96,
704 — "width": 358.58484,
"startIndex": 74,
"endIndex": 106,
"fontStyling": {
    "fontFamily": "sans-serif",
    "ascent": 0.93896484375,
706 — "descent": -0.22216796875,
    "vertical": false,
    "fontHeight": 21.96
},
"content": "Programmable DC Electronic Loads",
"renderedSpan": {
    "span": {},
    "left": 102.74,
    "top": 259.082,
708 — "width": 350,
    "height": 22,
    "scaledHeight": 22,
    "scaledWidth": 358.2915
},
"sourceElement": {
    "str": "programmable DC Electronic Loads",
    "dir": "ltr",
    "width": 358.58484,
    "height": 21.96,
710 — "transform": [21.96, 0, 0, 21.96, 102.74, 515.35],
    "fontName": "g_d0_f3",
    "hasEOL": false,
    "totalPageTextStringStartPosition": 74
},
"lastZoomLevel": 1

FIGURE 7

METHODS AND APPARATUS FOR SELECTING, HIGH LIGHTING AND/OR PROCESSING, TEXT INCLUDED IN A PDF DOCUMENT

RELATED APPLICATIONS

The present application is a continuation of U.S. patent application Ser. No. 17/896,695 filed on Aug. 26, 2022, now abandoned, and said application is hereby being expressly incorporated by reference in its entirety.

FIELD

The present application relates to document text selection, processing and/or display and more particularly to methods and apparatus for determining which displayed content, e.g., text, of a PDF document is selected and then taking an action based on the text selection, e.g., highlighting, copying, or editing the selected text.

BACKGROUND

Document Object Model (DOM) is a form of representation of structured documents as an object-oriented model. DOM is the official World Wide Web Consortium (W3C) standard for representing structured document s in a platform and language-neutral manner. DOM supports a set of objects that can be used to represent the structure of a document. The public interface of a DOM is specified in its application programming interface (API). Web browsers normally include or have access to a DOM API and/or another application that can be used to access DOM elements and/or extract text from a document or the DOM elements representing a document.

Portable Document Format (PDF), standardized as ISO 32000, is a file format that was used to represent documents. PDF documents often include a combination of text, glyphs and/or images. While text may be included in a PDF document it is often included as a set of references to text works and/or characters with information about where on a page the text is to be positioned for display.

PDF documents can and sometimes are accessed through a DOM (Document Object Model) interface provided by a Web browser with the PDF document being represented in the browser in some cases using DOM elements. The DOM interface or API can be used to interact with a PDF document. The DOM is one of the most-used APIs (Application Programming Interfaces) on the Web and it allows code running in a browser to access and interact with every node or element in the document. A DOM element is a part of a document that can be accessed using the DOM interface. An element may contain a data item or a chunk of text or an image. A typical element includes an opening tag with some attributes, enclosed text content, and a closing tag. An attribute extends an element and can change its behavior or provide metadata, e.g., information useful in rendering an image from the DOM element.

PDF documents often include one or more pages of text. Various applications can be used to extract the text elements from the PDF document. Size, font and some intended page display location may be and extracted with the text. Such information is from the PDF file and may be considered pre-rendering information since it is available before an image is rendered for display. Rendering is the process of generating a displayable image from data in a file. If may involve scaling and/or some changes to the position of the text to make it suitable for display, e.g., on a display screen of a cell phone or other device. Because of changes made to size and/or position of text, the actual display location of text on a page when presented as a rendered image may differ from the location and/or size indicated by the pre-rendered text and/or PDF file element information.

The potential miss-match between the actual position and size of displayed text and the position/size information included with extracted text may make interpreting text selection operations difficult. This is because a user may indicate text to be selected by marking a start and end selection point within a displayed page. These points may not correspond precisely to the locations that would be expected from the information included with the extracted text since such information may not reflect changes in text location or size made as part of the rendering process. Using the mouse indicated locations on a page directly as if they matched and/or were consistent with the text location information included with extracted text may result in a miss-interpretation of what text was selected, e.g., with one or more selected text characters being omitted and/or potentially one or more characters which were not selected being interpreted as being included in the selected text.

Information of precisely what text, e.g., displayed characters, are selected by a user using a mouse or other making device to identify text being selected on a screen is important not only for purposes of text editing operations but also for such things as determining what displayed text to highlight on the display screen as having been selected.

Determination of what text of a document was actually selected by a user marking a text selection on a displayed page is a technical problem. In many cases processing resources are limited particularly where the device implementing the operations is a cell phone or another device. While various applications or application calls can be used to extract text information or rendering information, the text extraction, rendering and/or document element information requests are often handled separately by different applications or different portions of an application programming interface. A document may include multiple elements and it can be difficult and require processing resources to determine if extracted text corresponding to a pre-rendering area corresponds to a rendered document object which corresponds to a displayed image area which is of a different size or positioned at a different location than the location specified by the information associated with extracted text.

When a page of a document is being displayed from a user perspective it is desirable that the user be able to quickly and accurately mark text of a page and the device displaying the text be able to accurately indicate, e.g., through highlighting, the selected text. While this might seem like a simple task it can be complicated by possible discrepancies between the location or size information associated with text extracted from a document, e.g., a PDF document, the information included in PDF elements and/or the location and/or size of rendered text displayed to a user upon which a selection operation is performed.

In view of the above it should be appreciated that there is a need for methods and/or apparatus for accurately identifying user selected text of a displayed PDF document portion, e.g., page and/or taking an action based on what text is determined to be selected. It would be desirable if accurate identification of the user selected text could be performed in response to a user selection operation with requiring a large amount of processor resources at the time of text selection and/or without having to make a large number of calls to different applications in an attempt to determine what text corresponds to a user selected area of a displayed page or portion of a page.

SUMMARY

Methods and apparatus for determining which displayed content, e.g., text, of a PDF document is selected and then taking an action based on the text selection, e.g., highlighting, coping, or editing the selected text. In at least some embodiments a JavaScript application implemented by a Web browser is used to support PDF document display, text selection and editing operations.

The methods and apparatus are well suited for use in a device with limited processing resources and allow for accurate identification of text which has been selected by a user indicating a text selection on a displayed text page, e.g., using a marking device to define a box on the displayed screen. The methods and apparatus take into consideration potentially differences between text position and/or size differences between rendered and displayed page content and text position and/or size information obtained from performing a text extraction operation on the content of a PDF document.

In at least some embodiments prior to user selection of text of a PDF page which is being displayed, text is extracted from one or more PDF pages. The extracted text information may be and sometimes is stored to support editing and/or other operations. In addition, pre-render DOM element information is retrieved, e.g., by making a DOM API call. Rendered DOM element information is also obtained. Extracted text information which includes pre-render position and/or text size information is correlated to the separately retrieved pre-render and/or post render DOM element information. A Jaccard Index value may and sometimes is generated as part of the correlation process and the value of the Jaccard Index is used to confirm a match between text corresponding to a pre-render area to a DOM element corresponding to a similarly but potentially not identically sized post render area of a page, e.g., a displayed image of a page which can be selected.

Extracted text information corresponding to a DOM element is combined with post render DOM element information and, optionally, corresponding pre-render DOM element information to form what is referred to herein as a synthetic or synthesized text element. Thus, the synthesized text element corresponding to a DOM element includes both extracted text information, corresponding extracted text indicated text position and/or size information and corresponding DOM element information which can include pre and post rendering size and/or position information.

The correlation of DOM element information, e.g., pre and post rendering information to extracted text information can and sometimes does involve matching of text box size and location information obtained associated with the extracted text with post rendering DOM element information indicating the location and size of the rendered text in a displayed image, e.g., an image of a PDF page or portion of a PDF page.

The correlation operation performed to match information corresponding to individual DOM elements with the extracted text corresponding to the DOM element can and sometimes is performed before a user selects any displayed text, e.g., while text is displayed, and another processing operation is not being performed. Thus, the extraction, correlation and generation of synthesized text elements can be performed while the user is reading or viewing initially displayed PDF document text.

In at least some embodiments one synthesized text element is created for each DOM element of a document page, e.g., of a PDF file being viewed. The synthesized text element includes both extracted text position information as well as rendered text position information for the DOM element to which the synthesized text element corresponds. This makes it possible to correlate a selected area of a displayed page, which is a rendered image of PDF content, to the extracted text. Because the post render position and/or size information included in a synthesized text element will match the displayed area and the synthesized element also includes the expected area for extracted text the synthesized text element includes both extracted text size and position information and post render size and position information that can be used to easily determine what text a user selected displayed portion of a page corresponds to.

In order to make synthesized text elements easy to access and use, e.g., as part of a process of identifying selected text based on a user selection of a portion of displayed page, in at least some embodiments synthesized text elements are stored as individual nodes in a data structure based on the position information. In some embodiments the position information used to organize synthetic text elements is the position of the rendered DOM element on a displayed page to which the synthesized text element corresponds. In at least one embodiment synthesized text elements are loaded into a K-D tree with each individual synthesized text element being a node in the K-D tree located at a position in the tree based on the display location of the DOM element to which the node/synthesized text element corresponds. A K-D tree (short for k-dimensional tree) is a space-partitioning data structure for organizing points or nodes in a k-dimensional space. K-D trees are a useful data structure for spatial searches, e.g., where neighbor areas are to be identified. The K-D tree is well suited for storing synthetic text elements in a way that allows the relevant nodes, e.g., synthetic text elements, to be easily identified and access based on the location of an image area in a rendered PDF page which is selected.

During a text selection operation, e.g., when a user selects a portion of a page displayed in a PDF editing application, start and stop position coordinates, e.g., mouse coordinates, of the selection operation's beginning and end are determined and used to define a selection area on the display page content. The selection area is defined as a rectangular bounding box in some embodiments.

The selection bounding box position and size information is used to access nodes in the K-D tree of synthesized text elements which correspond to rendered DOM elements which are fully or partially in the selection bounding box. Text corresponding to accessed synthetic text element which are determined to correspond to a rendered DOM element falling fully within the select area are determined selected and the extracted text of such synthetic text elements is determined to have been selected.

The information in synthetic text elements which have rendered text falling partially within the selected area are considered further with information in the synthetic text element and/or information obtained by making a DOM range element API call being used to determine precisely which portion, e.g., characters, of the extracted text in the synthetic text element has been selected.

Once the extracted text characters corresponding to the selected displayed image area have been identified based on the accessed synthesized text element, an action can be taken based on the identified selected text, e.g., an area to be highlighted is determined and a highlight applied on the screen and/or an indication of the selected text characters is communicated to an editing application or editing function so that the text can be deleted or altered.

By combining extracted text information with post-render information corresponding to individual DOM elements in synthesized text elements and then storing the information in an easily access data structure, accurate identification of selected text characters can be made in a relatively fast manner using a browser implemented application for PDF and/or other documents which are accessed and displayed using a device which supports and/or implements a DOM interface. Accordingly, the methods and apparatus are particularly well suited for cell phone or other devices which implement a web browser which supports DOM functions and/or has a DOM interface which can be used to access, display, select and/or alter document content.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 4 shows pre-rendered DOM elements corresponding to the PDF file shown in FIG. 3.

FIG. 7 illustrates a synthetic text element, also referred to as a synthesized text element, generated from the information shown in FIGS. 4, 5, and 6 and corresponding to the exemplary PDF file content shown in FIG. 3.

DETAILED DESCRIPTION OF THE INVENTION

Figure 1:
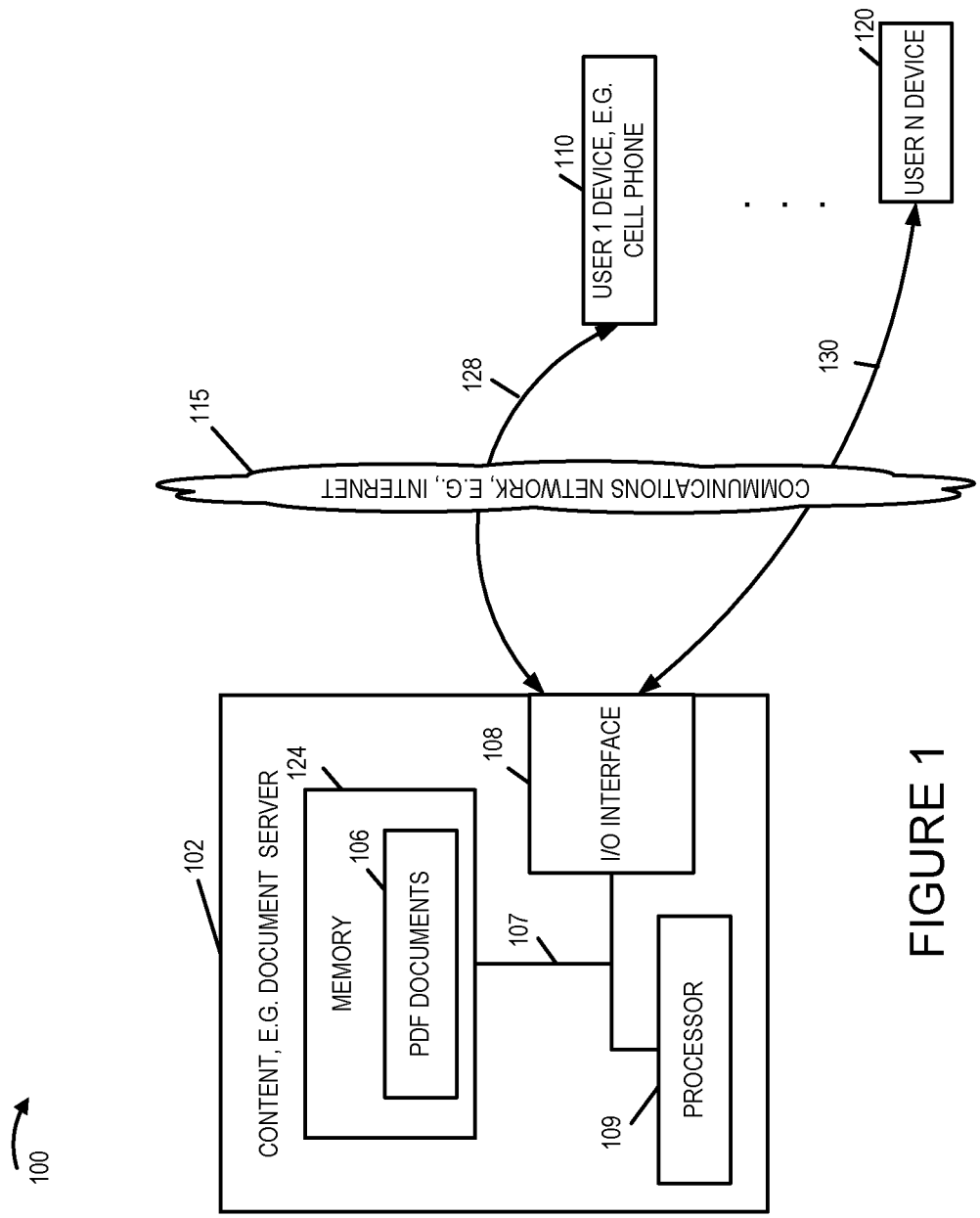
FIG. 1 is a drawing of an exemplary system in accordance with one exemplary embodiment.

FIG. 1 is a drawing of an exemplary system 100 implemented in accordance with one exemplary embodiment. The system 100 includes a content, e.g., document server 102 which is coupled to user devices 110, 120 via a communications network 115 which may be the Internet. The document server 102 includes a memory 124 which includes a plurality of PDF documents 106 that are supplied upon request to one or more of the user devices 110, 120. The memory 124 is coupled by bus 107 to a processor 109 which controls server operation and an I/O interface 108 for receiving document requests and suppling documents in response to received requests. Via the interface 108 documents are supplied over the communications network 115 to user devices 110 and 120 via communication links 128, 230 respectively. User device 110, 120 may be in a variety of forms. For example, user device 110 is a cell phone while user device 120 may be and sometimes is a desktop computer, notepad device, laptop or another computing device which includes a web browser and/or other application that can be used to retrieve and process applications in accordance with the invention.

Figure 2:
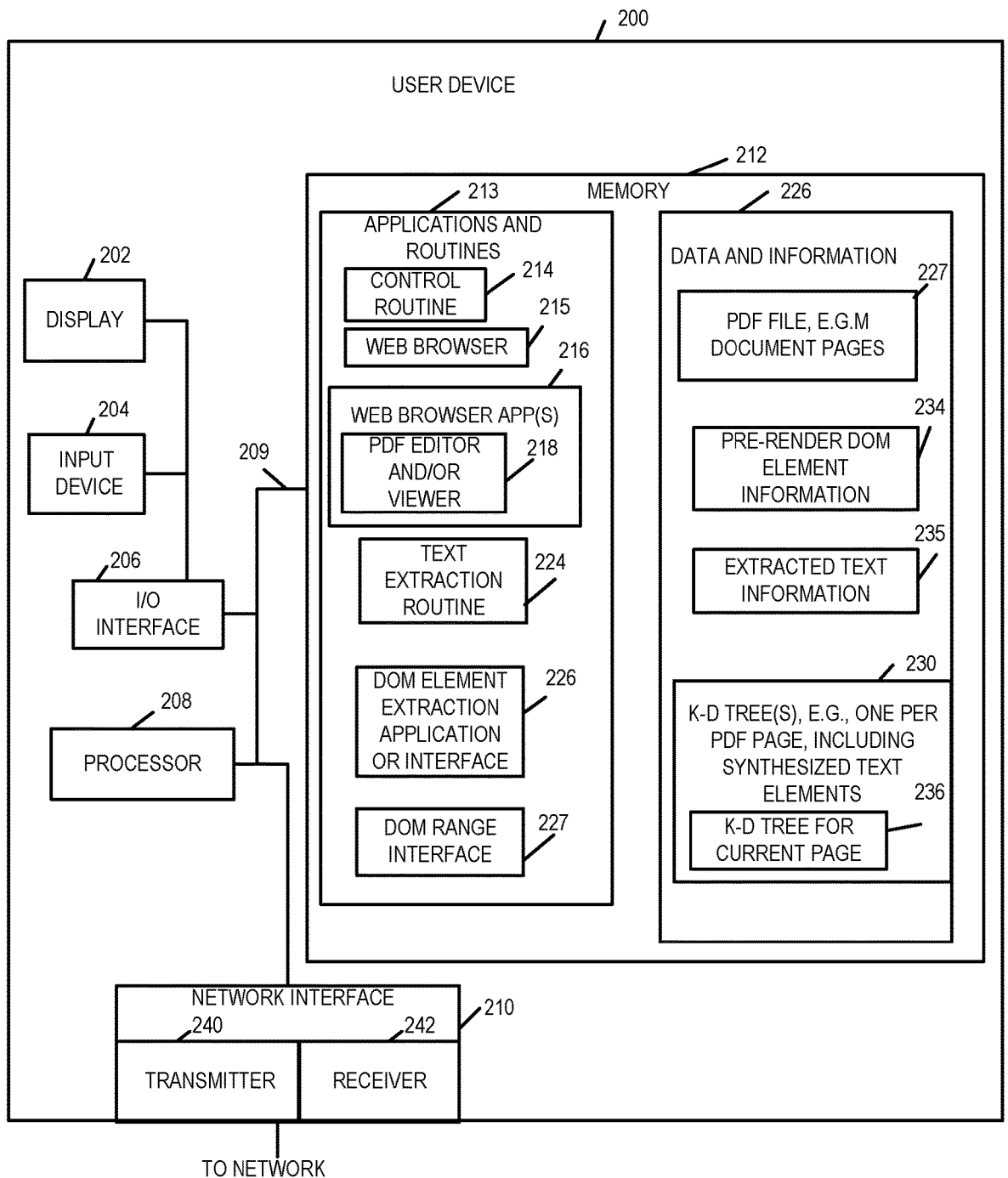
FIG. 2 shows an exemplary user device which implements an exemplary method of supporting document retrieval, display, text retrieval and search operations in accordance with one exemplary embodiment of the present invention.

FIG. 2 shows an exemplary user device 200 which can be used as any one of the user devices 110, 120 shown in FIG. 1.

User device 200 implements an exemplary method of supporting document retrieval, selecting PDF displayed page content, and then taking an action based on the selection, e.g., highlighting, coping, and/or editing selected text. The method will be discussed in further detail with reference to the flow charts included in some of the other figures of the present application including FIG. 11 which shows the steps of an exemplary method implemented by device 200 in some embodiments. The exemplary user device 200 may be a cell phone, laptop computer, desktop computer, note pad device or other computing device capable of receiving and processing PDF document contents in accordance with the invention.

The exemplary user device 200 includes a display 202, input device 203 which are coupled to an I/O interface 206, The input device 204 can be, for example, a keyboard and/or mouse which can be used by a user of the device 202 to select content, e.g., PDF documents for retrieval, selecting a portion of a PDF page for editing, copying or text deletion, to enter scroll or page change commands, provide search input such as text words and/or to input a command or select a displayed option to initiate a search or retrieval of a document. The I/O interface 206 is coupled by bus 209 to processor 208, memory 212 and network interface 210. The network interface includes a transmitter 240 for sending document requests and other information, e.g., to network 115 and server 102 and a receiver 242 for receiving one, more or all pages of a requested document. Document requests that are made by a user in some embodiments are presumed to request retrieval, loading and display of pages from the start of a requested document unless the user provides a starting page. If a starting page, e.g., corresponding to a chapter or portion of document of interest is indicated with a user provided document retrieval request, page retrieval and display will begin at the specified page with other pages being retrieved subsequently.

The bus 209 allows document pages, commands, and other information to be communicated between the components coupled to the bus 209. The memory 212 includes applications and routines 213 and data/information 226. The applications and routines 213 include computer executable instructions which, when loaded into the processor 208, are executed and used by the processor 208 to control operation of the user device in accordance with the invention. Data and information 226 stored in the memory 212 includes retrieved document data and other information which can be used by the applications and routines and/or displayed to a user of the device 200.

The applications and routines 213 include a control routine 214 which controls the user device to implement the method of the present invention by loading and executing one or more of the other routines and applications stored in the memory 212. The applications and routines 213 further include a web browser 215. The applications and routines 213 also include web browser applications 216 which in some embodiments includes a PDF editor and/or viewer 218 that implements JavaScript based PDF document retrieval, display, searching and text extraction operations in accordance with the invention and which in some cases runs in the web browser application 216. The web browser application 216 may, and sometimes does, make calls to other routines or applications which may be part of the web browser 216 or a DOM API (Application programming interface) supported or implemented by the web browser 216. The routines or API's which can be called by the PDF editor and/or web browser include a text extraction routine 224 which can extract text elements from a PDF document, e.g., a PDF page including text. A DOM element extraction application or interface 226 and/or a DOM range interface 227. The DOM element extraction application or interface 226 in some embodiments is part of the DOM application programing interface of the Web browser 215 and allows the PDF editor 218 to request and receive DOM element content that is used to represent a PDF page that is to be edited and/or subject to selection operations. The DOM range interface 227 can be used to access DOM objects using a positional range. This can be useful when an image area is known and the DOM objects corresponding to area are to be accessed and/or manipulated. The text extraction routine 224 in some embodiments is implemented using a publicly available PDF.JS function or subroutine which can extract text from a portion of a PDF document when called. In some embodiments, one or more or all of the text extraction routine 224, DOM element extraction application 226 and DOM range interface 227 are included as part of the web browser application 216. The web browser application 216 maybe and sometimes is a JavaScript based application.

In addition to the various routines which will be discussed further with regard to the flow charts shown in other figures, the memory 212 includes various data and information 226. The data/information 226 includes a retrieved PDF document file, e.g., including one or more PDF pages. The document pages 227 maybe PDF content retrieved from server 102 in response to a user document request entered into the web browser 216, which can be displayed and processed, e.g., subject to selection, editing and/or copy operations, in accordance with the invention. The data and information 226 also include pre-render DOM element information which can be extracted from a document being processed by the web browser using the web browser's DOM interface and/or extraction application 226. Extracted text, e.g., text corresponding to individual DOM elements is extracted in some embodiments and stored in extracted text information storage 235 for processing and possible combining with extracted DOM element to what are refereed to herein as synthetic or synthesized text elements as will be discussed below.

Generated synthesized text elements which include extracted text and corresponding DOM element information are stored in individual nodes which are arranged in a tree data structure based on positions on the rendered page to which the text and corresponding DOM element relate. This makes access of the synthesized text and corresponding DOM element information easy when the access is based on the position of an image area which has been selected, e.g., for editing or other reasons.

Stored K-D tree information 230 includes one K-D tree of synthesized text elements for each page of text of a PDF document being viewed or processed. Element 236 is a K-D tree of synthesized text elements for a current page being processed, e.g., a page of text displayed in a window of an editor application being executed and used to edit a document, e.g., a PDF document.

Figure 3:
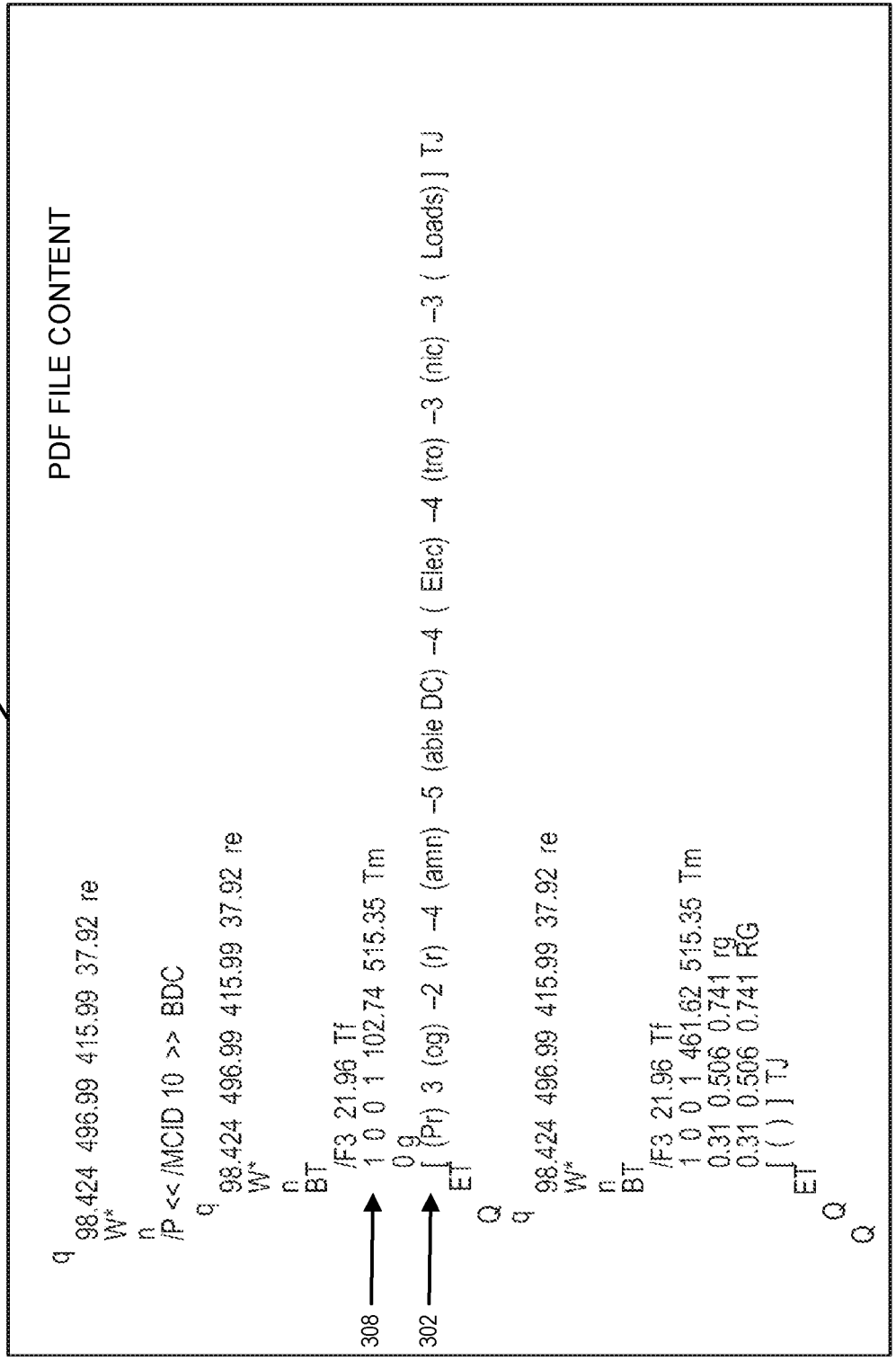
FIG. 3 shows an exemplary set of PDF file content used to explain various features.

FIG. 3 shows exemplary PDF file content used to explain various features. The methods and apparatus of the present invention will be explained in the context of an example of selecting text from an exemplary PDF page that is displayed. FIG. 3 shows the exemplary PDF file 227' that represents a single text page that will be used to explain the method of the invention. The PDF file content shown in FIG. 3 will be processed by the processor 208 of the user device 200 to generate an image of the PDF page contents with the text of the exemplary page being positioned and subject to processing during rendering. The positioning and processing of the text in the PDF file 227' as part of the rendering of an image from the file will, in part, be based on transform data 308 which is included in the PDF file for use in the rendering process. The text to be displayed is shown on line 302 and spells the phrase "Programmable DC Electronic Loads". As part of the rendering process, the PDF file is loaded by the Web browser application 215 and represented in memory as one or more DOM element which can be accessed using the DOM interface supported by the Web Browser 216. Thus, it should be appreciated that as part of the rendering process the PDF file contents are arranged by the Web browser 215 and represented in memory 212 as one or more DOM elements.

FIG. 4 shows pre-rendered DOM elements corresponding to the PDF file shown in FIG. 3. The DOM element 234' includes pre-rendering style information 408 that includes intended text positioning information, font information, and scaling information to be used during the image rendering process. The pre-rendered DOM element information 234' can be and sometimes is retrieved by a call to the DOM element extraction interface 226 in accordance with the invention.

Figure 5:
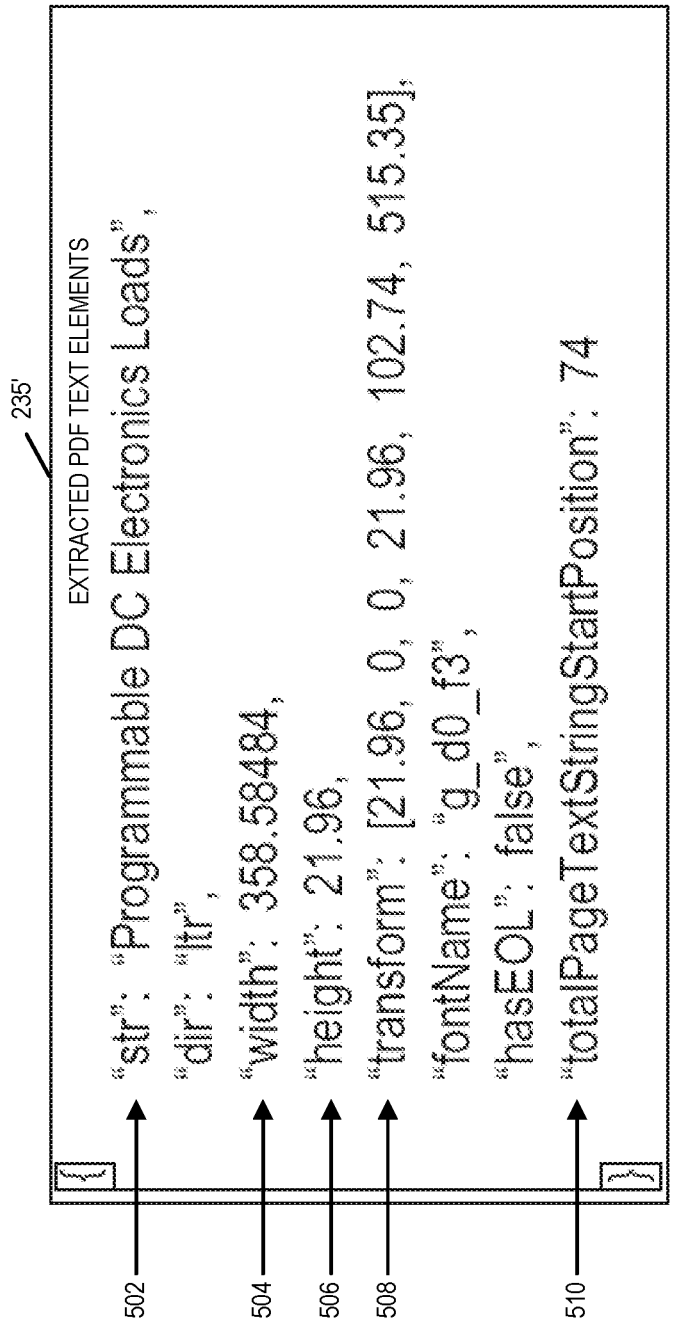
FIG. 5 shows extracted text elements corresponding to the PDF file shown in FIG. 3.

FIG. 5 shows extracted text element information 235' corresponding to the PDF file 227' of FIG. 3 and the DOM element 234' which is retrieved in some embodiments after loading of the PDF file and thus page represented by the PDF file by the Web browser application into memory, e.g., under control of the PDF viewer/editor 218 which is executed as a Web browser application in some embodiments. The extracted PDF text element includes the text string 502 which is the text that will be displayed, width information 504 and height information 506 which relate to the intended width and height of the text to be rendered. The text element information includes transform information 508 which includes some position information which is included in the style portion of the pre-rendered DOM element 234'. Notably the text element 235' lacks scaling information since the text element 235' is not intended to be used directly in image rendering. Thus, the position and size information indicated in the extracted PDF text element 235' may not and often will not match the exact position and/or size of rendered text generated from the PDF file shown in FIG. 3. Since user selection is performed on rendered text, the lack of scaling information can make it difficult to determine user selection coordinates marked on a rendered text image precisely what text was marked if only the content of the extracted PDF text element 235' is considered in combination with user mouse selection coordinates which correspond to a rendered image. In the FIG. 5 example element 510 includes information indicating the character start position on the page of the text string "Programmable DC Electronics Loads". That is the "P" will be positioned starting at charter position 74. For purposes of text selection and editing it can be useful to think of the displayed content in terms of text characters since a user normally seeks to mark a set of text characters and not select half or some other fractional portion of a displayed text character. In fact, in some embodiments selection and marking of text is performed on a per line basis with a user being able to select a portion of a line of text with the selection boundary or edge being interpreted as corresponding to the vertical edge between glyphs, text characters. Multiple lines of text can be selected but for representation and processing each line of text is normally treated as one or multiple text object represented at display time by corresponding rendered DOM objects.

Correlation, e.g., matching, of extracted text objects to the corresponding pre-rendered and/or rendered DOM objects is performed in some embodiments based on the size and location information included in the extracted text element closely matching the size and location information of a DOM object and/or rendered DOM object. Thus, in some embodiments for each extracted text object a matching DOM object is identified and pre and/or post rendering DOM position information can then be associated with the matching text object, e.g., in a synthesized text element.

Figure 6:
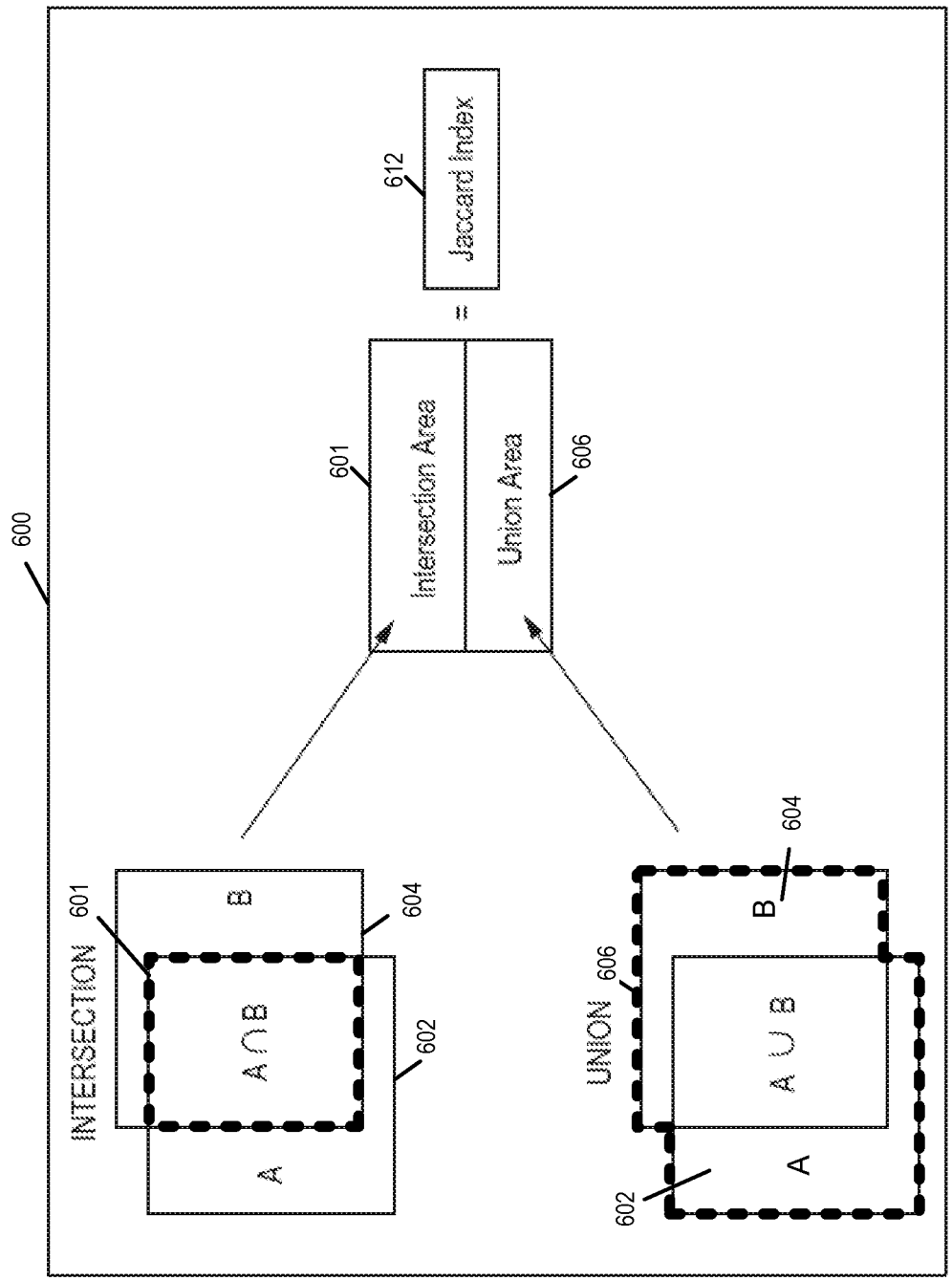
FIG. 6 is a diagram showing how a Jaccard Index is generated in some embodiments corresponding to first and second bounding boxes where the first bounding box maybe a bounding box corresponding to extracted text information and the second bounding box corresponds to rendered text of a DOM element to which the extracted text corresponds.

As a check of the reliability of the results of a text element to DOM element matching a bounding box comparison is performed. A Jaccard Index comparison is used in some embodiments with a Jaccard index over 0.5 but in some cases over a larger number such as 0.8 or 0.9 indicating a successful match. FIG. 6 is a diagram 600 showing how a Jaccard Index is generated in some embodiments corresponding to first and second bounding boxes where the first bounding box maybe a bounding box corresponding to extracted text information and the second bounding box corresponds to rendered text of a DOM element to which the extracted text corresponds. Assuming A 602 is the area indicated by the extracted text element as the text display area and B 604 is the area of the matching rendered DOM element the Jaccard index 612 is computed by dividing the Intersection area 60' by the area 606 of the union are areas 602, 604. The closer to 1 the Jaccard value is the better the match is. In order for a successful match to be determined in some embodiments the Jaccard index is required to be over a predetermined threshold, e.g., greater than 0.5, 0.8 or 0.9 depending on the particular exemplary embodiment. In various embodiments information from a text element determined to match a DOM element is combined with the DOM information for the matching element to form what is referred to as a synthesized or synthetic element with these terms being used interchangeably sometimes in the present application to refer to the same thing, e.g., type of element.

As discussed above, as part of the exemplary process information from an extracted element is combined with information relating to a corresponding DOM element to form a synthesized text element. FIG. 7 illustrates a synthesized, e.g., synthetic, text element 700, also referred to as a synthesized text element, generated from the information shown in FIGS. 4, and 5 and corresponding to the exemplary PDF file content shown in FIG. 3.

The exemplary synthesized text element 700 includes information from the pre-rendered DOM element 234', matching extracted PDF text element 235' shown in FIG. 5 and correspond post render information in some embodiments. Position information 702 is from the DOM element 234', height and width information 704 is from the extracted text element information 235', font styling information 706 is from the pre-render DOM element information 234', information 708 is post rendering and/or scaling information relating to the text to which the synthetic element 700 corresponds and information 710 which is source element information is extracted from the corresponding set of extracted text information 235'. Thus, each synthetic text element in some embodiments includes a combination of extracted text information, DOM element information and rendered text information which can be used match a selected rendered image area to the underlying text element to which it corresponds. This can be used to quickly identify which characters of the matching text string should be highlighted to show text selection and is particularly useful where scaling or other operations result in the size an/or position of the rendered text characters to vary from what is expected by the position and/or size information returned with the extracted text element information.

In various embodiments a synthetic text element is generated for each extracted text element which is matched to a DOM element.

To allow for quick and easy access to synthetic text elements with relevant information when a rendered image portion is selected, the synthetic text elements are loaded into a searchable tree structure based on the rendered position of the DOM element to which the synthetic text elements correspond. In at lease some embodiments a K-D tree data structure is used to store the synthetic text elements in memory to make them easily accessible base on position information relating to selected area within a rendered image, e.g., PDF page, to which the synthetic text elements correspond.

Figure 8:
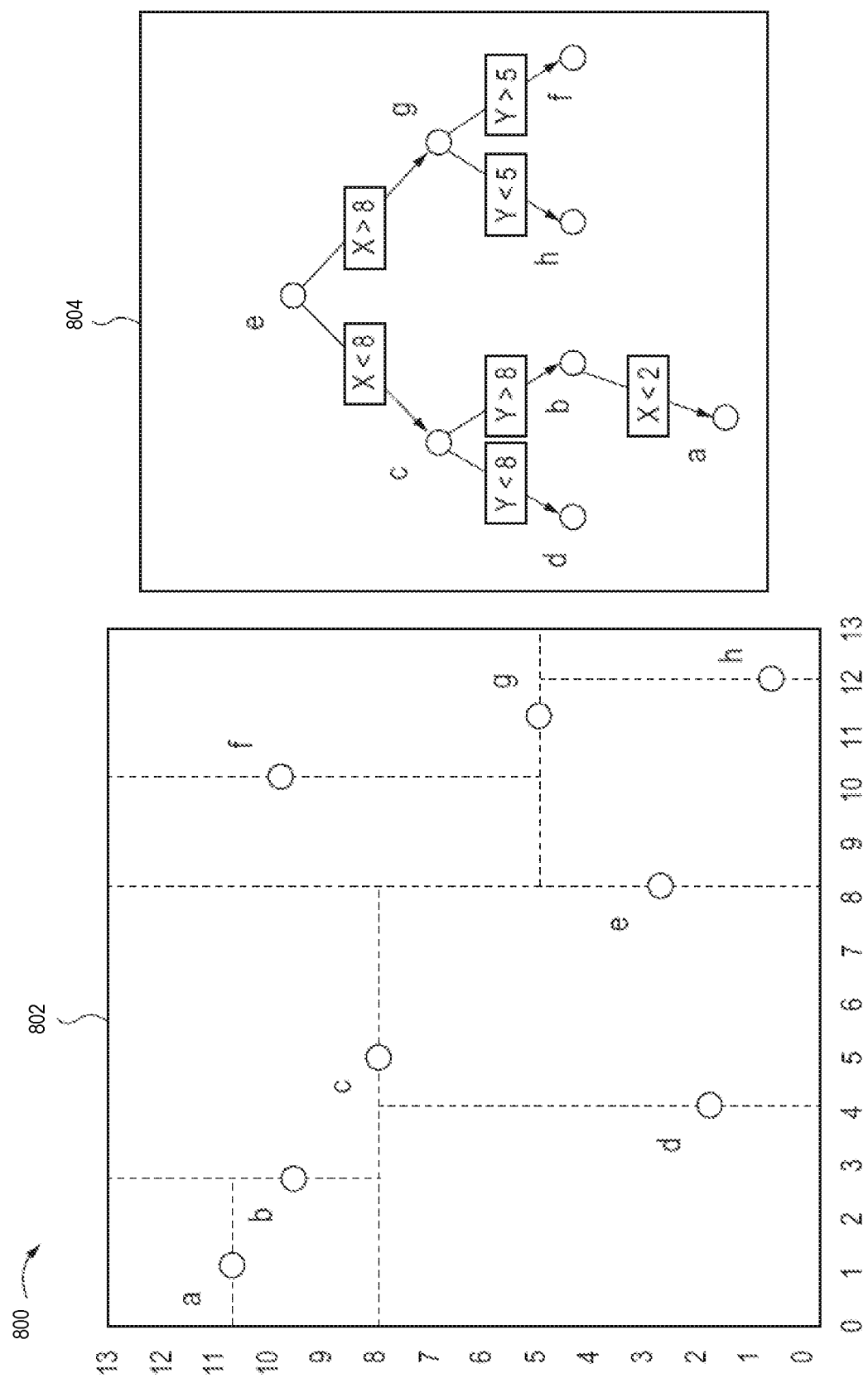
FIG. 8 shows an exemplary set of image portions and a corresponding K-D data structure.
Figure 9:
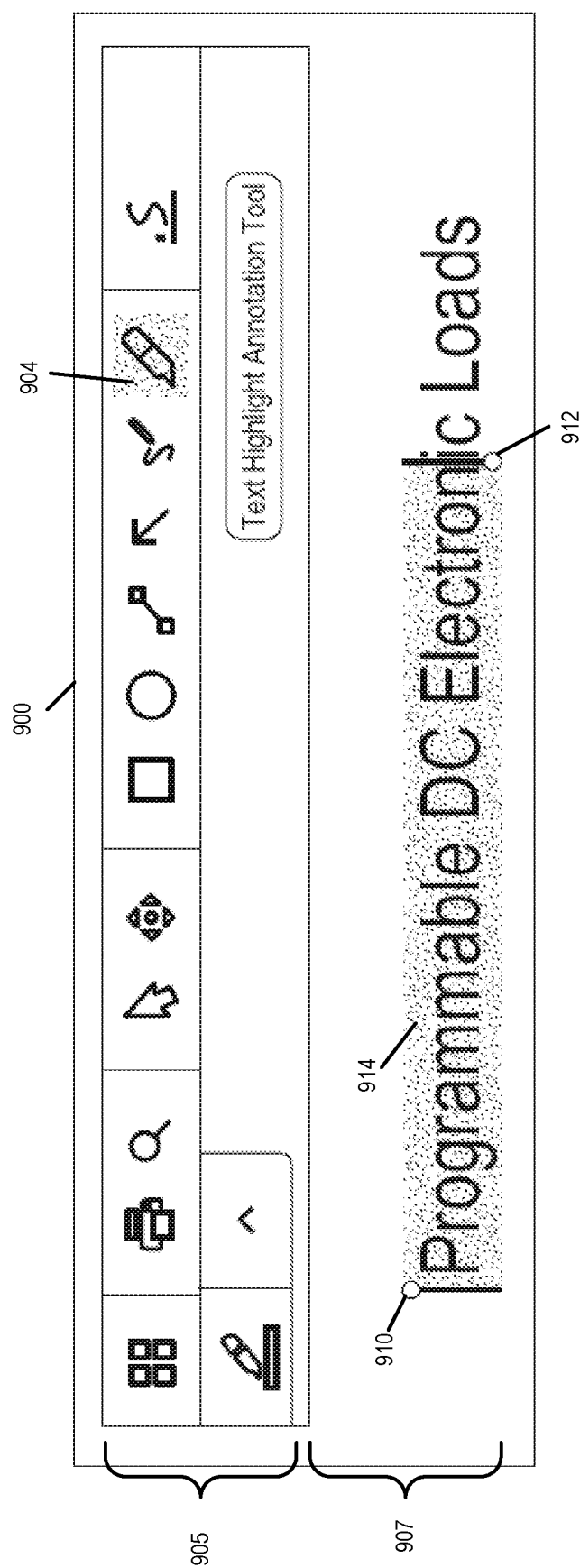
FIG. 9 shows an image of a displayed PDF application with the content of the PDF file of FIG. 3 rendered as a page from which text can be selected for editing.

FIG. 8 is a diagram 800 showing an exemplary set of rectangular image portions in area 802 and the and a corresponding K-D data structure 804. Each rectangular image portion is represented by a letter in area 802 with the circle next to the letter representing the node in the K-D tree 804 to which the area corresponds. FIG. 8 is exemplary of a K-D data structure and does not show the K-D structure which would be implemented in the case of the FIG. 9 example which shows the rendering of a text string corresponding to a single DOM element. In the case of FIG. 9 in which a single text and corresponding DOM element are used, the K-D tree would include a single node.

FIG. 9 shows an image 900 of a displayed PDF page 907 below a tool bar 905 in a selection and editing window of editing application 218 running in the Web browser 215 and with the content of the PDF file of FIG. 3 rendered as a page from which text can be selected for editing.

Figure 10:
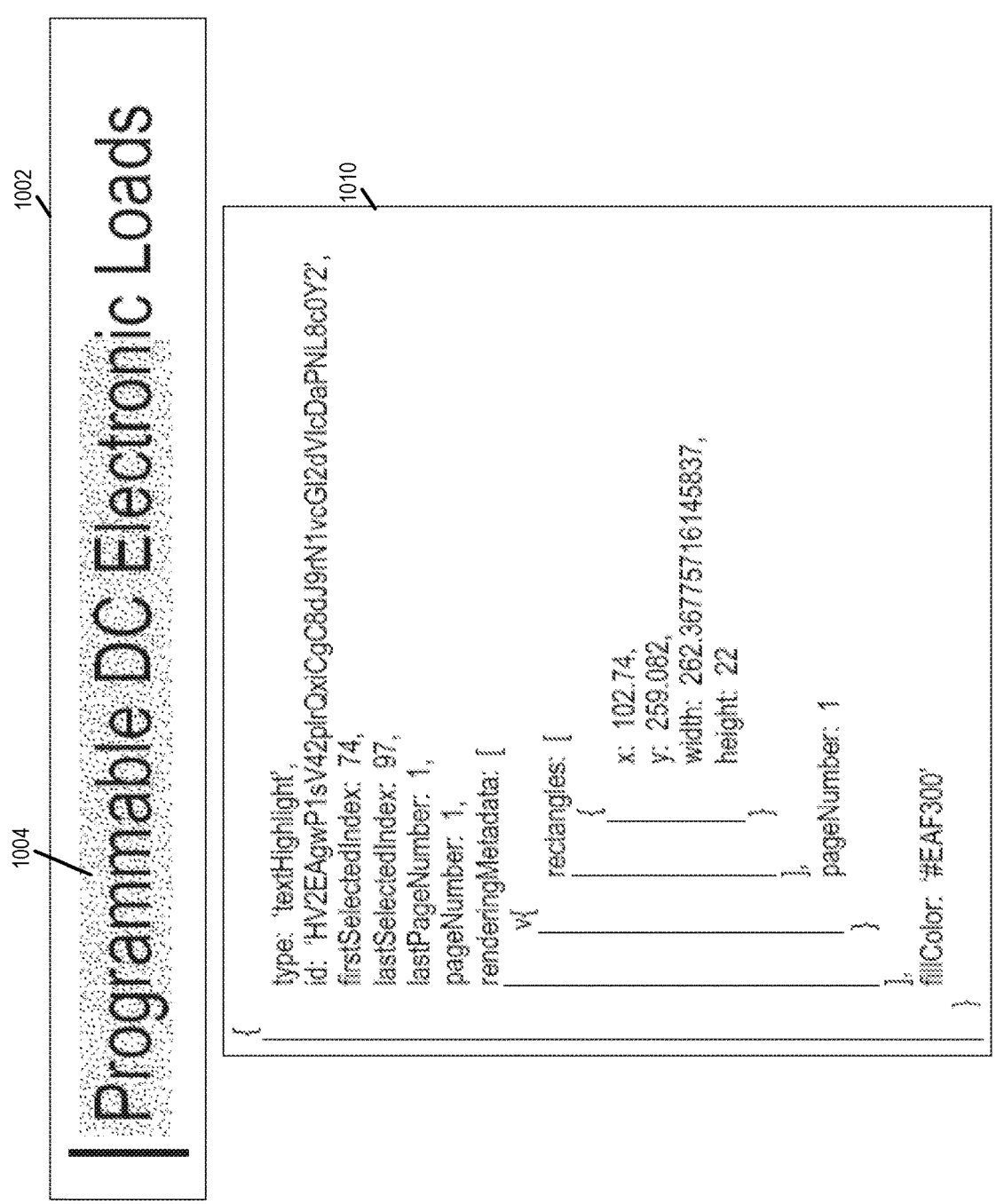
FIG. 10 shows highlighted text after highlighting due to a selection operation using the editing application shown in FIG. 9 along with code used to implement the highlight.

FIG. 10 shows highlighted text after highlighting due to a selection operation using the editing application shown in FIG. 9 along with code used to implement the highlight. Selection tool 903 is shown as being highlighted to show that a selection operation is being performed. Selection start point 910 and selection stop point 912 are indicated to show where a user starts and stops marking a selection area. The selection area 914 is stippled to indicate the area corresponding to a selection bounding box defined by points 910 and 912 which can be specified as pairs of (x,y) coordinates where x and y correspond to points along different dimensions of displayed image. While the marked area may not match a character boundary in some embodiments the marking operation will be interpreted as intending to correspond to full text characters and should stop and start on a vertical glyph edge in the case of most languages including English, e.g., a text character, edge.

FIG. 10 shows the results 1002 of the text marking operation as it will appear in the lower portion of the editor window shown in FIG. 9 after highlighting represented by shading is applied to the text determined to have been selected along with code 1010 which can be used to control the highlighting of the selected text.

Figure 11A:
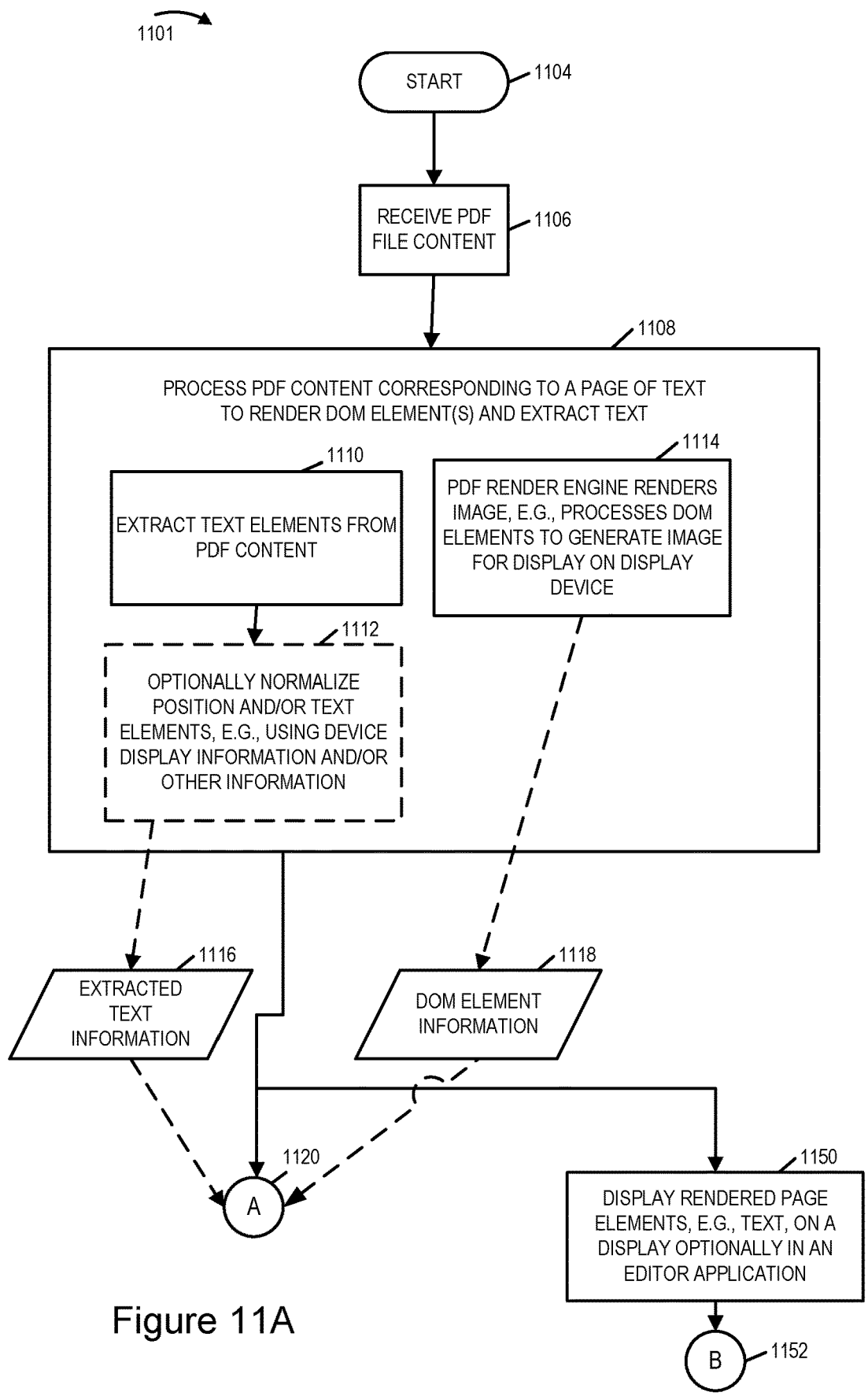
FIG. 11A shows a first part of an exemplary flow chart showing steps of an exemplary PDF file content display, selection and modification method implemented in accordance with the invention.
Figure 11B:
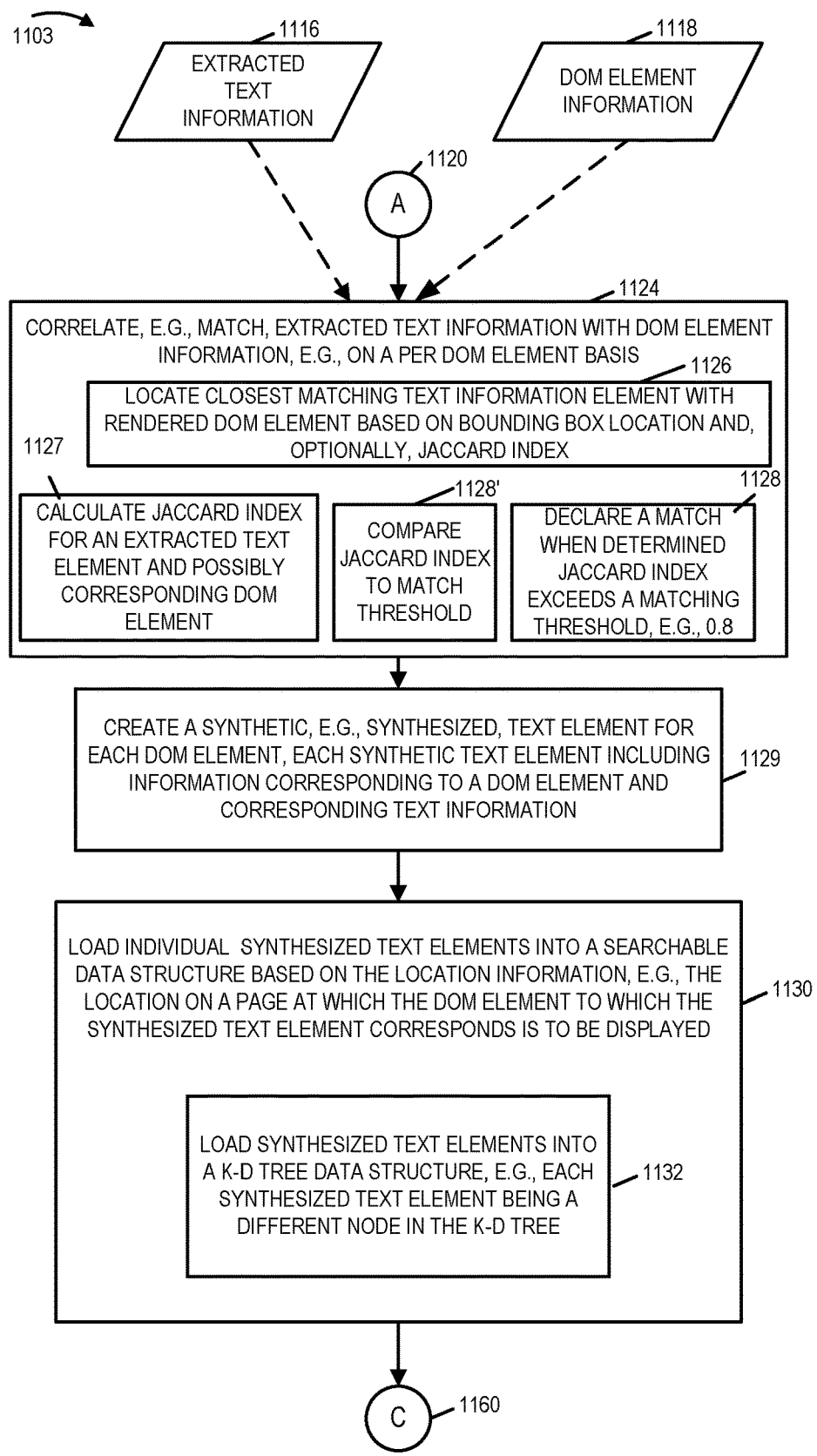
FIG. 11B shows a second part of the exemplary flow chart showing steps of an exemplary PDF file content display, selection and modification method implemented in accordance with the invention.
Figure 11C:
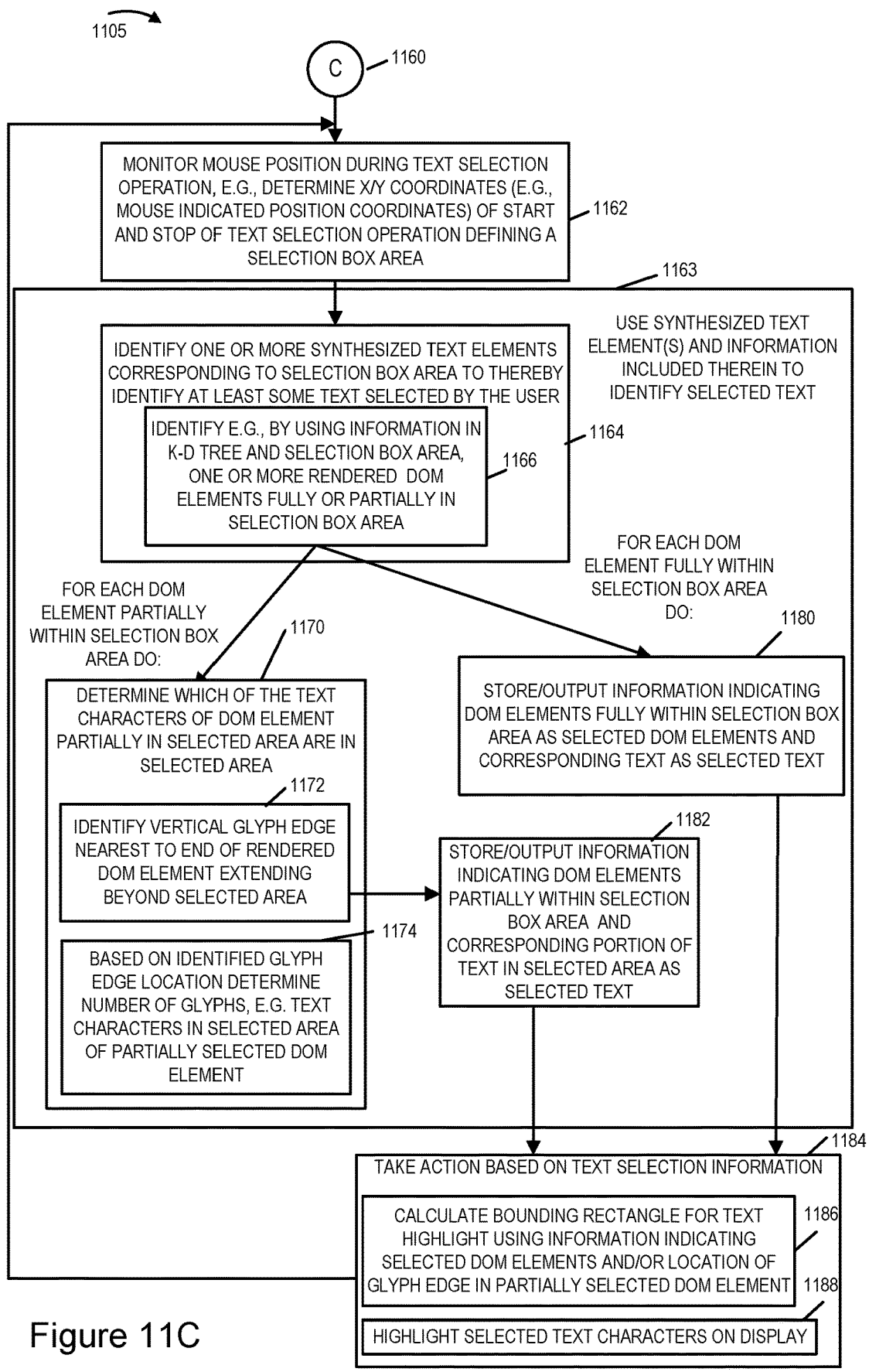
FIG. 11C shows a second part of the exemplary flow chart showing steps of an exemplary PDF file content display, selection and modification method implemented in accordance with the invention.
Figure 11:
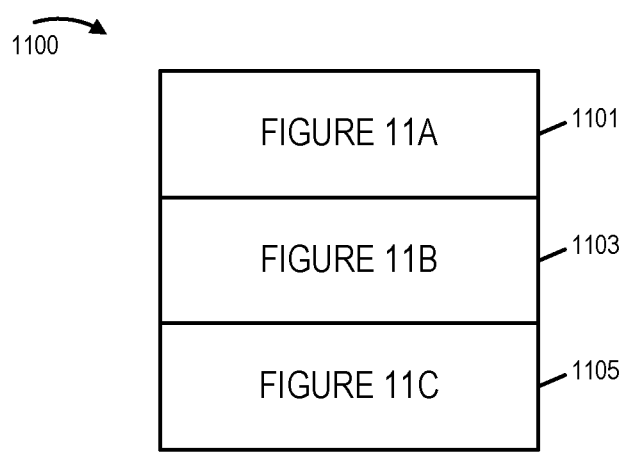
FIG. 11 shows how FIGS. 11A, 11B and 11C can be combined to form a complete flow chart shown the steps of the exemplary method.

As shown in the FIG. 11 diagram 1100 the FIG. 11A diagram 1103, FIG. 11B diagram 1105 and FIG. 11C diagram can be combined as shown to form a complete flow chart which will be referred to as FIG. 11. Thus, FIG. 11 comprises the combination of FIGS. 11A, 11B and 11C and shows the steps of an exemplary PDF file content display, selection, and modification method implemented in accordance with the invention.

The exemplary method shown in FIG. 11 beings in start step 1104, shown in FIG. 11A, with the processor beginning to execute the Web browser 215 and related applications/routines/interfaces including the PDF editor/viewer 218 which in some embodiments is implemented as a JavaScript application executed by the web browser 215. Operation proceeds from step 1104 to receive step 1106 in which the web browser receives or retrieves a PDF file including one or more pages. Operation then proceeds to step 1108 in which PDF content corresponding to a page of text is processed to generate a rendered image and extract text and DOM elements corresponding to the PDF file that are stored, generated or created by the Web browser as part of the rendering operation which is performed using a DOM interface and/or applications.

In step 1110 one or more text elements are extracted from the PDF file, e.g., page content. In step 1112 the text element information is optionally processed to normalize position and/or text elements, e.g., using device display information and/or other information. Extracted text element information 1116 is generated in step 1110. If the normalization operation of step 1112 is performed, the normalized extracted text information is used as the extracted text information 1116. Operation proceeds from processing step 1108 via connecting node A 1120 to step 1124 of FIG. 11B.

In addition to the text extraction step 1108 pdf content processing step 1108 involves performing a PDF rendering operation to render an image of the page being processed. This may and sometimes does involve the generation and/or processing of one or more DOM elements to generate a rendered image from the PDF file content representing a page to be displayed. The result of step 1114 is DOM element information 1118 which can include both pre-render and/or post render extracted DOM element information. While operation proceeds from step 1108 via connecting node A 1120 to step 1124 it also proceeds to step 1150 in which the rendered page elements, e.g., text, are displayed on a display, e.g., in the editor/viewer application window which can be used to select text for highlighting and/or used in editing or copying operations.

Operation proceeds from step 1150 via connecting node 1152 to monitoring step 1162 of FIG. 11C. However before discussing the steps of FIG. 11C, the steps of FIG. 11B will be discussed since the steps of FIG. 11B are normally completed, at least with regard to the displayed page, relatively quickly often, but not always, before a user completes a text selection on the displayed.

Referring now to FIG. 11B, it can be seen that the inputs to step 1124 are the extracted text information 1116 and the DOM element information 1118. The extracted text information 1116 could be, e.g., the information shown in FIG. 5 in an example where the PDF file being processed includes the content shown in FIG. 3. The DOM element information 1118 may and sometimes does include the pre-rendered dome element information shown in FIG. 4 and/or post render DOM information. The DOM element information maybe and sometimes is referred to as extracted DOM information because it is generated from the PDF file information even if it is not directly extracted from the PDF file information and set aside or extracted from the information used or generated in rendering the PDF file.

In step 1124 extracted text elements are correlated, e.g., matched with DOM element information on a per DOM element basis. This in some cases involves step 1126 which involves locating a closest matching text information element with a rendered DOM element based on bounding box location information indicating where the rendered DOM element is to be placed on a rendered page and the pre-render text information indicating where the text of an extracted text element is to be placed. As discussed above the location associated with the text element may be slightly different than the location of the corresponding DOM element due to scaling and/or other processing performed during image rendering of the DOM element(s) of a page. In some but not all embodiments step 1124 includes step 1126 and/or steps 1127, 1128' and 1128. In step 1126 a text information element is matched to a spatially closest extracted DOM element based on a first bounding box indicating the expected displayed location of the text of the text element as indicated by the position information indicated in the extracted text element and a second bounding box indicating the expected rendered location of the DOM element in the displayed page image. Optionally the declaration or determination of a match can be contingent on the generation of a Jaccard index and the index value exceeding a match threshold. Thus, in some embodiments the method includes step 1127 wherein a Jaccard index is generated from information included in the extracted text element and from information including the DOM element to which it is being matched. In step 1128' a threshold comparison of the Jaccard index generated in step 1127 to a match threshold is made. In step 1128 a match is declared when the Jaccard index exceeds the match threshold.

In one exemplary embodiment a Jaccard index is generated from the information in the extracted text element shown in FIG. 5 and rendered text position information corresponding to the DOM element shown in FIG. 4. In one such case the Jaccard index exceeds a match threshold of 0.8 and a match is declared between a first DOM element and a first extracted text element.

With the comparison processing having been completed and one or more extracted text elements having been matched to corresponding DOM elements operation proceeds to step 1129 in which a synthetic, e.g., synthesized, text element is created for each set of extracted text elements and DOM elements which were determined to match. FIG. 7 shows an exemplary synthesized text element generated from the information in FIG. 4 which shows a DOM element which corresponds to the extracted PDF text element shown in FIG. 5.

Operation proceeds from step 1162 to step 1130 in which individual synthesized text elements created in step 1129 are located into a searchable data structure based on the location information, e.g., location on a page at which the DOM element to which the synthesized text element corresponds is to be displayed page. The information, e.g., one or more sensitized text elements included in the searchable data structure are subsequently used to determine which text was selected by a user marking a text selection on a displayed portion of a rendered PDF document page. In some embodiments step 1130 includes step 1132 in which the synthesized text elements generated in step 1129 are located into a K-D tree with each synthesized text element being a different node in the generated K-D tree and positioned at a location in the tree which is based on rendering position information relating to individual nodes added to the tree.

With the synthesized text elements having been generated and loaded into the K-D tree so that they can be accessed and used, e.g., in response to a user selecting text on a displayed screen, operation proceeds via connecting node C 1160 to monitor input device, e.g., mouse, position, step 1162 shown in FIG. 11C.

In step 1162 input device position is monitored during a text selection operation and XY coordinates of a start and stop position determined during a selection operation are determined and a selection box area defined based on the marker points. With selection information having been indicated with regard to the displayed page image operation proceeds to step 1163 in which one or more synthesized text element(s), including at least a first synthesized text element, are used to identify which text was selected by a user. The stored synthesized text elements include at least a first synthesized text element in some embodiments. Step 1163 includes multiple sub-steps to take into consideration that all the text corresponding to a rendered DOM element may be selected or a portion of the text depending on whether a rendered DOM element corresponding to a selection area falls fully or partially within the selected area.

Step 1163 includes step 1164 in which one or more synthesized text elements corresponding to the selection box area are identified, e.g., by accessing the stored K-D tree as indicated in step 1166. In step 1166 one or more rendered DOM elements are identified with individual identified element(s) being partially or fully within the selected image area depending on where they are located relative to the selection area.

For each DOM element identified in step 1164 which is partially in the identified selection area, e.g., selection bounding box, operation proceeds to step 1170. In step 1170 a determination is made as to which of the text characters of the DOM element that are partially in the selected area are actually located in the selected area. That is when the DOM element corresponds to a text string, which portion, and thus which characters, of the text string is to be considered inside the selected area and what remaining charters are to be considered outside the selected area. Step 1170 in some embodiments includes steps 1172 and step 1174. In step 1172 a vertical glyph edge, e.g., text character edge, nearest to the end of the rendered DOM element extending beyond the selected area is identified. Then in step 1174 based on the identified glyph edge location the number of glyphs, e, g., text characters, are actually in the selected area. In this way the number of text characters in the string corresponding to the DOM element can be identified and the highlight edge selected to match an edge of a character rather to a location which extends vertically through an individual character which would create ambiguity as to whether or not the character was selected. With information on what portion of a text string was selected having been determined in step 1168 operation proceeds to step 1182 in which information indicating DOM elements partially within the selection box area and corresponding portions of text which have been selected is stored in memory for use in subsequent actions, e.g., defining a bounding box for a highlight area, highlighting the selected text and/or taking a text editing operation determined selection information.

With regard to DOM elements which were identified in step 1164 that are fully within the selection box area, operation proceeds from step 1164 to step 1180. In step 1180 information indicating DOM elements identified as being fully within the selection box is stored. Operation proceeds from step 1180 to step 1184 in which an action is taken based on the information indicating the DOM elements and/or portions of DOM elements which were determined to have been selected. In step 1186 a bounding rectangle for text highlighting is determined based on the information indicating which DOM elements were fully or partially selected and/or the location of one or more glyph edges in a partially selected DOM element.

In step 1188 the bounding box generated in 1186 is used to apply a text highlight to characters on the displayed page. Note that the bounding box used for text highlighting maybe and often is different from the bounding box defining the selection area since it is based on character edge position information and is defined not to vertically pass through a displayed character but rather indicate selection of one or more complete text character when a text selection is made.

Operation is shown proceeding from step 1184 to store 1162 to shown that multiple selection and highlighting operations can be implemented using the information stored in the K-D tree of synthetic text elements without having to repeat the page processing required to initially generate the K-D tree used to support accurate highlighting of selected text.

While having already described the exemplary embodiment and many features of the invention the following discussion of various terms used in the description may help in understanding the invention and exemplary embodiment.

Portable Document Format (PDF) is an open standard for document exchange. A PDF document is a combination of text and binary data. The logical structure of a PDF file is hierarchical and determines the sequence by which a viewing application draws the document's pages and their contents. A PDF is composed of four components: objects, file structure, document structure and content streams.

A DOM element is a part of a document or webpage that can be accessed using the DOM interface. An element may contain a data item or a chunk of text or an image. A typical element includes an opening tag with some attributes, enclosed text content, and a closing tag. An attribute extends an element and can change its behavior or provide metadata, e.g., information useful in rendering an image from the DOM element.

The DOM (Document Object Model) is an API that represents and interacts with a document. The DOM is a document model loaded in the browser and representing the document as a node tree, where each node represents part of the document (e.g., an element, text string, or comment). The DOM is one of the most-used APIs on the Web because it allows code running in a browser to access and interact with every node in the document. Document Object Model (DOM) is a form of representation of structured documents as an object-oriented model. DOM is the official World Wide Web Consortium (W3C) standard for representing structured document s in a platform and language-neutral manner. DOM supports a set of objects that can be used to represent the structure of a document. The public interface of a DOM is specified in its application programming interface (API). Web browsers normally include or have access to a DOM API and/or another application that can be used to access DOM elements and/or extract text from a document or the DOM elements representing a document.

Rendering is the process of generating an image to be displayed, e.g., on a display device from a set of data providing image data.

A Bounding Box can be any 4 points in Cartesian space that define four corners of a rectangle, where the internal angles created by the lines are all 90 degrees.

A k-dimensional tree method for partitioning data using the spatial relationship between each data point. K in this context refers to the dimensionality of the spatial data used to relate the data points together (typically k=2 or k=3).

PDF Text Elements—are a grouping of PDF instructions that renders a segment of text to the display when processed by a PDF rendering engine. This may include element-specific positioning, transformation (scale, rotate, skew) matrices, styling information (fonts, bold/italics/strikethrough/etc.) and a list of glyphs to render. If the element does not define values for any of these properties, it is inherited from the parent element, if any, or from the defaults specified in the PDF Specification the renderer is implemented to support. The units, scaling, and calculations for processing these elements are complex and typically require specialized mathematical formulas to reproduce.

DOM Text Elements are Document Object Model (DOM) elements that include the instructions in HTML or another language to control the browser to render a variety of content to the screen, both interactive and static. DOM Text Elements typically contain a number of glyphs to be rendered to the screen. This may include element-specific positioning, transformation (scale, rotate, skew) matrices, styling information (fonts, bold/italics/strikethrough/etc.), defined inline using Cascading Style Sheets or referenced by an id, class or other CSS method. If the element does not define values for any of these properties, it is inherited from the parent element, if any, or from the defaults specified in the HTML Specification the browser implements, including platform or implementation specific additions or deviations.

Extracted Text Elements are text elements parsed from the PDF file and which in some cases have been translated into the Web browser's JavaScript environment for use in application code.

Synthesized or Synthetic Text Elements are aggregate elements created using pre-rendered DOM Text Elements, Extracted Text Elements, and/or preprocessed data. In various embodiments they are used for insertion into and lookup from a k-d tree that is accessed to retrieve information that is used to determine what text was highlighted and/or to create the final bounding box for the text highlight.

PDF Viewer Text Highlights are a list of one or more bounding boxes that, when displayed relative to the top left corner of the page, cover the desired text using a semi-transparent color.

In one but not necessarily all embodiments one particular exemplary method maybe described as a series of steps which will now be discussed as a sequence of the following operations:

1. The PDF Editor/Viewer processes the PDF Extracted Text Element, applying normalizations and lookups using the data from the element
2. The PDF Editor/Viewer processes the PDF rendering engine's extracted text elements which includes a width, height, transform array, and the text index position of where in the total page text string the current element fits. All this data is used to calculate the bounding box for the current element; a height, width, and the offset from the top and left relative to the page in the browser. This includes the current state of the rendered document including the current zoom level and page rotation.
3. The calculated bounding box from one example is: {height: 21.96, width: 358.58484, left: 102.74, top: 259.082}
4. The DOM element is actually visible when viewing the PDF while the underlying text element to which the rendered text corresponds is not viewable and may be indicated in an extracted text element to be positioned at a slightly different location from the location at which it is rendered and displayed.
5. The method then involves locating the closest matching rendered DOM Text Element, using a Jaccard Index comparison between the extracted text bounding box and the DOM Text Element bounding box
6. In one example the DOM Bounding box is: {height: 22, width: 350, left: 102.74, top: 259.082}
7. The Jaccard index for this example: 0.9743268690245491 and exceeds a match threshold, e.g., of 0.8 so a match is declared between the extracted text and the corresponding DOM element.
8. Information from the matching extracted text and extracted DOM elements is then combined into a Synthetic Text Element containing preprocessed information, including a reference to the DOM Text Element in the browser, and the start index of the text contained in the element, with respect to the total text of the page.
9. The generated Synthetic Text Element is then loaded into a k-d tree using its bounding box.
10. At that point it would have access to both the DOM ({height: 22, width: 350, left: 102.74, top: 259.082}) and extracted text ({height: 21.96, width: 358.58484, left: 102.74, top: 259.082}) bounding boxes to do these calculations.

In one such embodiment when a user creates or updates a Text Highlight in the Viewer/Editor performs the following:

11. Given the position of the Mouse relative to the page rendered in the PDF Editor/Viewer
12. This can theoretically be anywhere on the screen and the method will do its best to find the closest possible bounding boxes, but for the purposes of the example the starting point might be (x: 107, y: 265) and an exemplary ending point might be (x: 366, y: 272).
13. Use the Mouse positions defining the selected bounding box to access the k-d tree to find the nearest Synthetic Text Element(s) within the selected area and identify one or more synthetic text elements corresponding to the selected rendered image region.
14. Using a Synthetic Text Element determined to match a portion of the selected area, create a DOM Range object using the Browser API, and use a Binary Search to locate the closest glyph edge to the Mouse position. Each glyph could be a character or image or really anything selectable within the pdf. Since bounding boxes do not wrap in some embodiments, (a new line would be a new bounding box), we only are concerned in such embodiments about the width of the glyphs when determining the edge of the selected area to be highlighted. A Range is defined at (https://developer.mozilla.org/en-US/docs/Web/API/range) It's a very large object that is used in some embodiments to determine which index we are at within the text being highlighted. The bounding boxes we have been dealing with so far are for whole text elements, in the case of this example the text element in question is "Programmable DC Electronic Loads" as a whole. So that bounding box is not completely accurate when the text highlighted is only "Programmable DC Electro". So, we use the Range and the text content to determine which glyphs are being highlighted so we can calculate how much of the bounding box width to omit from the actual Text Highlight annotation.

15. A Bounding Box is then created and used to define a highlight area on the display screen or update an existing Bounding Box used to define an already highlighted area. The left and right edges of the Bounding Box will be selected to match the closest edges of a left most and right most glyph respectively, as the end point. If a user is updating an existing text highlight a check can be made and the bounding box modified to ensure any proceeding text elements that are completely covered by the start and end point of the text highlight are included in the area to be highlighted. An exemplary Bounding box for the final highlight is: {left: 102.74, top: 259.082, width: 262.36775716145837, height: 22}

16. Once the text highlight bounding box has been defined an updated image of the page is rendered to the screen including the resulting highlight with transparent DOM elements matching the bounding boxes of the text highlight being used as part of the rendering process to cause the highlighting, e.g., transparent yellow, to be shown over the selected text.

Numbered List of Exemplary Method Embodiments

Method Embodiment 1. A method of operating a device (200) including a processor (208) and display (202), the method comprising: performing an extracted text element to a DOM element matching operation (1124) to identify individual text and DOM elements corresponding to a PDF page of a document which match, said matching operation matching a first extracted text element to a first DOM element; generating (1129) a synthesized text element including information from said first extracted text element and said first DOM element; and using (1163) the information in the first synthesized text element to determine which text was selected on said PDF page by a user selection operation.

Method Embodiment 2. The method of Method Embodiment 1, further comprising, prior to performing said matching operation: extracting (1110) one or more text elements from a PDF page, said extracted text elements including a first extracted text element; and extracting one or more DOM elements from the PDF page, said DOM elements including a first DOM element.

Method Embodiment 3. The method of Method Embodiment 1, further comprising: storing (1130) said synthesized text element in a data structure based on information indicating the position at which text included in the synthesizes text element is to be displayed in a rendered image of said PDF page.

Method Embodiment 4. The method of Method Embodiment 3, wherein storing said synthesized text element in a data structure includes storing (1132) said first synthesized text element as a node in a K-D tree.

Method Embodiment 5. The method of Method Embodiment 4, further comprising: in response to receiving information indicating a selection start point in a rendered image of the first page and a selecting stopping point in the rendered image of the first page, accessing (1166) the K-D tree to identify synthetic text elements having rendered image locations which fall fully or partially within a rectangular selection bounding box defined by said selection starting point and said selection stopping point.

Method Embodiment 6. The method of Method Embodiment 5, wherein performing an extracted text element to DOM element matching operation (1124) to identify individual text and extracted DOM elements which match includes: generating (1127) a Jaccard index based on a first area to which the first extracted text element corresponds and a second area to which the first DOM element corresponds; comparing (1128') the Jaccard index to a match threshold; and determining that said first extracted text element corresponds to the first extracted DOM element in response to said Jaccard index exceeding said match threshold.

Method Embodiment 6A. The method of Method Embodiment 6, wherein said match threshold is a value equal to or greater than 0.8.

Method Embodiment 7. The method of Method Embodiment 5, further comprising: identifying (1172) a vertical glyph edge location in the rendered image of the first page corresponding to a DOM element having rendered text which is partially located in the rectangular selection bounding box.

Method Embodiment 8. The method of Method Embodiment 7, further comprising: defining (1186) a text highlight area having a bounding box vertical edge corresponding to the identified vertical glyph edge location.

Method Embodiment 9. The method of Method Embodiment 8, wherein rendered text is subject to a scaling operation prior to display of the text; and wherein the defined text highlight area is of a size which differs from the size of the rectangular selection bounding box (e.g., the highlight area takes into consideration the glyph edge position and controls the edge of the text highlight bounding box so it is aligned to fall at a glyph edge rather than at the user selected edge of the selection area. This ensures that a portion of a text character will not be highlighted and that the highlighting is aligned with the edge of a text character in the case where the selected characters are text characters).

Method Embodiment 10. The method of Method Embodiment 9, further comprising: highlighting (1188) text in the defined text highlight area by applying a colored transparent overlay to the defined text highlight area.

Numbered List of Exemplary Apparatus Embodiments

Apparatus Embodiment 1. A document processing device comprising: a receiver for receiving a file representing a PDF document; a display; memory for storing the PDF document; and a processor, said processor being configured to: perform an extracted text element to DOM element matching operation to identify individual text and DOM elements corresponding to a PDF page of the PDF document which match, said matching operation matching a first extracted text element to a first DOM element; generate a synthesized text element including information from said first extracted text element and said first DOM element; and use the information in the first synthesized text element to determine which text was selected on said PDF page by a user selection operation.

Apparatus Embodiment 2. The document processing device of Apparatus Embodiment 1, wherein the processor is further configured to: extract, prior to performing said matching operation, one or more text elements from a PDF page, said extracted text elements including a first extracted text element; and extract one or more DOM elements from the PDF page, said DOM elements including a first DOM element.

Apparatus Embodiment 3. The document processing device of Apparatus Embodiment 1, wherein the processor is further configured to: store said synthesized text element in a data structure based on information indicating the position at which text included in the synthesizes text element is to be displayed in a rendered image of said PDF page.

Apparatus Embodiment 4. The document processing device of Apparatus Embodiment 3, wherein said processor is configured to store said first synthesized text element as a node in a K-D tree, as part of being configured to store said synthesized text element in a data structure.

Apparatus Embodiment 5. The document processing device of Apparatus Embodiment 4, wherein said processor is further configured to: access the K-D tree to identify synthetic text elements having rendered image locations which fall fully or partially within a rectangular selection bounding box defined by said selection starting point and said selection stopping point, said access operation being performed in response to receiving information indicating a selection start point in a rendered image of the first page and a selecting stopping point in the rendered image of the first page.

Apparatus Embodiment 6. The document processing device of Apparatus Embodiment 5, wherein the processor is configured to: i) generate a Jaccard index based on a first area to which the first extracted text element corresponds and a second area to which the first DOM element corresponds; ii) compare the Jaccard index to a match threshold; and iii) determine that said first extracted text element corresponds to the first extracted DOM element in response to said Jaccard index exceeding said match threshold, as part of performing an extracted text element to DOM element matching operation to identify individual text and extracted DOM elements which match includes:

Apparatus Embodiment 6A. The document processing device of Apparatus Embodiment 6, wherein said match threshold is a value equal to or greater than 0.8.

Apparatus Embodiment 7. The document processing device of Apparatus Embodiment 5, wherein the processor is further configured to: identify a vertical glyph edge location in the rendered image of the first page corresponding to a DOM element having rendered text which is partially located in the rectangular selection bounding box.

Apparatus Embodiment 8. The document processing device of Apparatus Embodiment 7, wherein the processor is further configured to: define a text highlight area having a bounding box vertical edge corresponding to the identified vertical glyph edge location.

Apparatus Embodiment 9. The document processing device of Apparatus Embodiment 8, wherein rendered text is subject to a scaling operation prior to display of the text; and wherein the defined text highlight area is of a size which differs from the size of the rectangular selection bounding box (e.g., the highlight area takes into consideration the glyph edge position and controls the edge of the text highlight bounding box so it is aligned to fall at a glyph edge rather than at the user selected edge of the selection area. This ensures that a portion of a text character will not be highlighted and that the highlighting is aligned with the edge of a text character in the case where the selected characters are text characters).

Apparatus Embodiment 10. The document processing device of Apparatus Embodiment 9, wherein the processor is further configured to: highlight text in the defined text highlight area by applying a colored transparent overlay to the defined text highlight area.

Numbered List of Exemplary Non-Transitory Computer Readable Medium Embodiments:

Non-Transitory Computer Readable Medium Embodiment 1. A non-transitory computer readable medium comprising processor executed instructions which when executed by a processor of a user device cause the user device to perform the steps of: performing an extracted text element to a DOM element matching operation to identify individual text and DOM elements corresponding to a PDF page of a document which match, said matching operation matching a first extracted text element to a first DOM element; generating a synthesized text element including information from said first extracted text element and said first DOM element; and using the information in the first synthesized text element to determine which text was selected on said PDF page by a user selection operation.

DOM elements can be included in a PDF document and/or created by a Web browser or other application, e.g., text editor and/or viewer application running in a browser, when processing a document.

Numerous variations on the above described methods and apparatus are possible and the possible maximum time limits are intended to be exemplary and not necessarily limiting or required for all embodiments. The order of steps may be changed in some embodiments and thus the order is exemplary unless the order of steps is exemplary unless required for functional reasons.

In various embodiments apparatus described herein are implemented using one or more components to perform the steps corresponding to one or more methods. Thus, in some embodiments various features are implemented using components. Such components may be implemented using software, hardware or a combination of software and hardware. In some embodiments in which the components are implemented in hardware, the components are implemented as circuits, e.g., of a processor. In many or all of the above-described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above-described methods. Accordingly, among other things, various embodiments are directed to a computer readable medium including computer executable instructions for causing a machine, e.g., processor or computer system, to perform one or more of the steps of the above-described method(s). Each of the steps of the method may be, and sometimes, are implemented by a circuit with different circuits being used for each of the different steps in some but not all embodiments.

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments, the image processing device is a desktop computer. In some embodiments the image processing device is a portable device, e.g., a laptop computer, handheld computer, tablet computer, smart phone, personal data assistant, etc., with a processor that implements the method.

In some embodiments components are implemented using software, in other embodiments components are implemented in hardware, in still other embodiments the components are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of operating a device including a processor and display, the method comprising:
    performing an extracted text element to a Document Object Model (DOM) element matching operation to identify individual text and DOM elements corresponding to a Portable Document Format (PDF) page of a document which match, said matching operation matching a first extracted text element to a first DOM element;
    generating a first synthesized text element including information from said first extracted text element and said first DOM element;
    storing said first synthesized text element in a data structure based on information indicating the position at which text included in the first synthesized text element is to be displayed in a rendered image of said PDF page, storing said first synthesized text element in a data structure including storing said first synthesized text element as a node in a k-dimensional (K-D) tree;
    receiving information indicating a selection start point in a rendered image of the PDF page and a selecting stopping point in the rendered image of the PDF page; and
    using the information in the first synthesized text element to determine which text was selected on said PDF page by a user selection operation, said step of using the information in the first synthesized text element to determine which text was selected on said PDF page including accessing the K-D tree to identify synthetic text elements having rendered image locations which fall fully or partially within a rectangular selection bounding box defined by said selection starting point and said selection stopping point.

2. The method of claim 1, further comprising, prior to performing said matching operation:
    extracting one or more text elements from said PDF page, said one or more extracted text elements including said first extracted text element; and
    extracting one or more DOM elements from the PDF page, said one or more DOM elements including said first DOM element.

3. The method of claim 1, wherein performing an extracted text element to DOM element matching operation to identify individual text and DOM elements which match includes:
    generating a Jaccard index based on a first area to which the first extracted text element corresponds and a second area to which the first DOM element corresponds;
    comparing the Jaccard index to a match threshold; and
    determining that said first extracted text element corresponds to the first DOM element in response to said Jaccard index exceeding said match threshold.

4. The method of claim 1, further comprising:
    identifying a vertical glyph edge location in the rendered image of the PDF page corresponding to a DOM element having rendered text which is partially located in the rectangular selection bounding box.

5. The method of claim 4, further comprising:
    defining a text highlight area having a bounding box vertical edge corresponding to the identified vertical glyph edge location.

6. The method of claim 5,
    wherein rendered text is subject to a scaling operation prior to display of the text; and
    wherein the defined text highlight area is of a size which differs from the size of the rectangular selection bounding box.

7. The method of claim 6, further comprising:
    highlighting text in the defined text highlight area by applying a colored transparent overlay to the defined text highlight area.

8. A document processing device comprising:
    a receiver for receiving a file representing a Portable Document Format (PDF) document;
    a display;
    memory for storing the PDF document; and
    a processor, said processor being configured to:
        perform an extracted text element to Document Object Model (DOM) element matching operation to identify individual text and DOM elements corresponding to a PDF page of the PDF document which match, said matching operation matching a first extracted text element to a first DOM element;
        generate a first synthesized text element including information from said first extracted text element and said first DOM element;
        store said first synthesized text element in a data structure based on information indicating the position at which text included in the first synthesized text element is to be displayed in a rendered image of said PDF page, storing said first synthesized text element in a data structure including storing said first synthesized text element as a node in a k-dimensional (K-D) tree;
        receive information indicating a selection start point in a rendered image of the PDF page and a selecting stopping point in the rendered image of the PDF page; and
        use the information in the first synthesized text element to determine which text was selected on said PDF page by a user selection operation, where using the information in the first synthesized text element to determine which text was selected on said PDF page including accessing the K-D tree to identify synthetic text elements having rendered image locations which fall fully or partially within a rectangular selection bounding box defined by said selection starting point and said selection stopping point.

9. The document processing device of claim 8, wherein the processor is further configured to:
   extract, prior to performing said matching operation, one or more text elements from said PDF page, said one or more extracted text elements including said first extracted text element; and
   extract one or more DOM elements from the PDF page, said one or more DOM elements including said first DOM element.

10. The document processing device of claim 8, wherein the processor is configured to:
   i) generate a Jaccard index based on a first area to which the first extracted text element corresponds and a second area to which the first DOM element corresponds;
   ii) compare the Jaccard index to a match threshold; and
   iii) determine that said first extracted text element corresponds to the first DOM element in response to said Jaccard index exceeding said match threshold, as part of performing an extracted text element to DOM element matching operation to identify individual text and DOM elements which match.

11. The document processing device of claim 8, wherein the processor is further configured to:
   identify a vertical glyph edge location in the rendered image of the PDF page corresponding to a DOM element having rendered text which is partially located in the rectangular selection bounding box.

12. The document processing device of claim 11, wherein the processor is further configured to:
   define a text highlight area having a bounding box vertical edge corresponding to the identified vertical glyph edge location.

13. The document processing device of claim 12,
   wherein rendered text is subject to a scaling operation prior to display of the text; and
   wherein the defined text highlight area is of a size which differs from the size of the rectangular selection bounding box.

14. A non-transitory computer readable medium comprising processor executed instructions which when executed by a processor of a user device cause the user device to perform the steps of:
   performing an extracted text element to a Document Object Model (DOM) element matching operation to identify individual text and DOM elements corresponding to a Portable Document Format (PDF) page of a document which match, said matching operation matching a first extracted text element to a first DOM element;
   generating a first synthesized text element including information from said first extracted text element and said first DOM element;
   storing said first synthesized text element in a data structure based on information indicating the position at which text included in the first synthesized text element is to be displayed in a rendered image of said PDF page, storing said first synthesized text element in a data structure including storing said first synthesized text element as a node in a k-dimensional (K-D) tree;
   receiving information indicating a selection start point in a rendered image of the PDF page and a selecting stopping point in the rendered image of the PDF page; and
   using the information in the first synthesized text element to determine which text was selected on said PDF page by a user selection operation, said step of using the information in the first synthesized text element to determine which text was selected on said PDF page including accessing the K-D tree to identify synthetic text elements having rendered image locations which fall fully or partially within a rectangular selection bounding box defined by said selection starting point and said selection stopping point.

* * * * *